United States Patent [19] [11] 3,971,853
Crowder [45] July 27, 1976

[54] FROZEN CONFECTION AND METHOD AND APPARATUS FOR MAKING SAME

[75] Inventor: John V. Crowder, Bethpage, N.Y.

[73] Assignee: Consolidated Foods Corporation, Chicago, Ill.

[22] Filed: Dec. 29, 1970

[21] Appl. No.: 102,411

[52] U.S. Cl. ............................. 426/249; 426/101
[51] Int. Cl.² .................. A23G 9/04; A23G 9/24; A23G 9/26
[58] Field of Search .......... 99/137, 138, 136, 180 R; 426/101, 249

[56] References Cited
UNITED STATES PATENTS

| | | | |
|---|---|---|---|
| 2,042,940 | 6/1936 | Herron | 99/136 |
| 2,246,871 | 6/1941 | Balch | 99/137 UX |
| 2,347,083 | 4/1944 | Connellee | 99/180 |
| 2,570,031 | 10/1951 | Gibson | 99/137 |
| 2,689,798 | 9/1954 | Bond | 99/138 |

Primary Examiner—Jeanette M. Hunter
Attorney, Agent, or Firm—Seidel, Gonda & Goldhammer

[57] ABSTRACT

A frozen confection which is comprised of a plurality of ingredients of individual colors. In some portions of the frozen confection the colors of the various ingredients are discrete and are readily identifiable. In other portions of the frozen confection the ingredients intermingle and thereby form colors which are different from the colors of the initial ingredients. Additionally, a gravity feed arrangement for feeding a plurality of nozzles with ingredients disclosed. Finally, a particular nozzle having a plurality of inlet conduits and one discharge opening for forming the frozen confection is disclosed.

3 Claims, 10 Drawing Figures

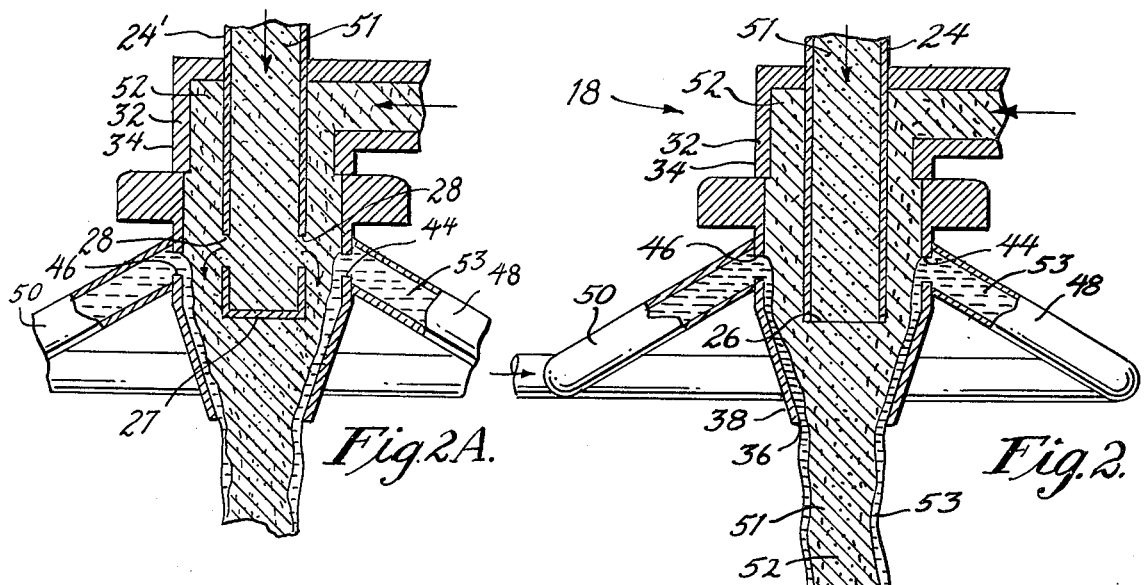
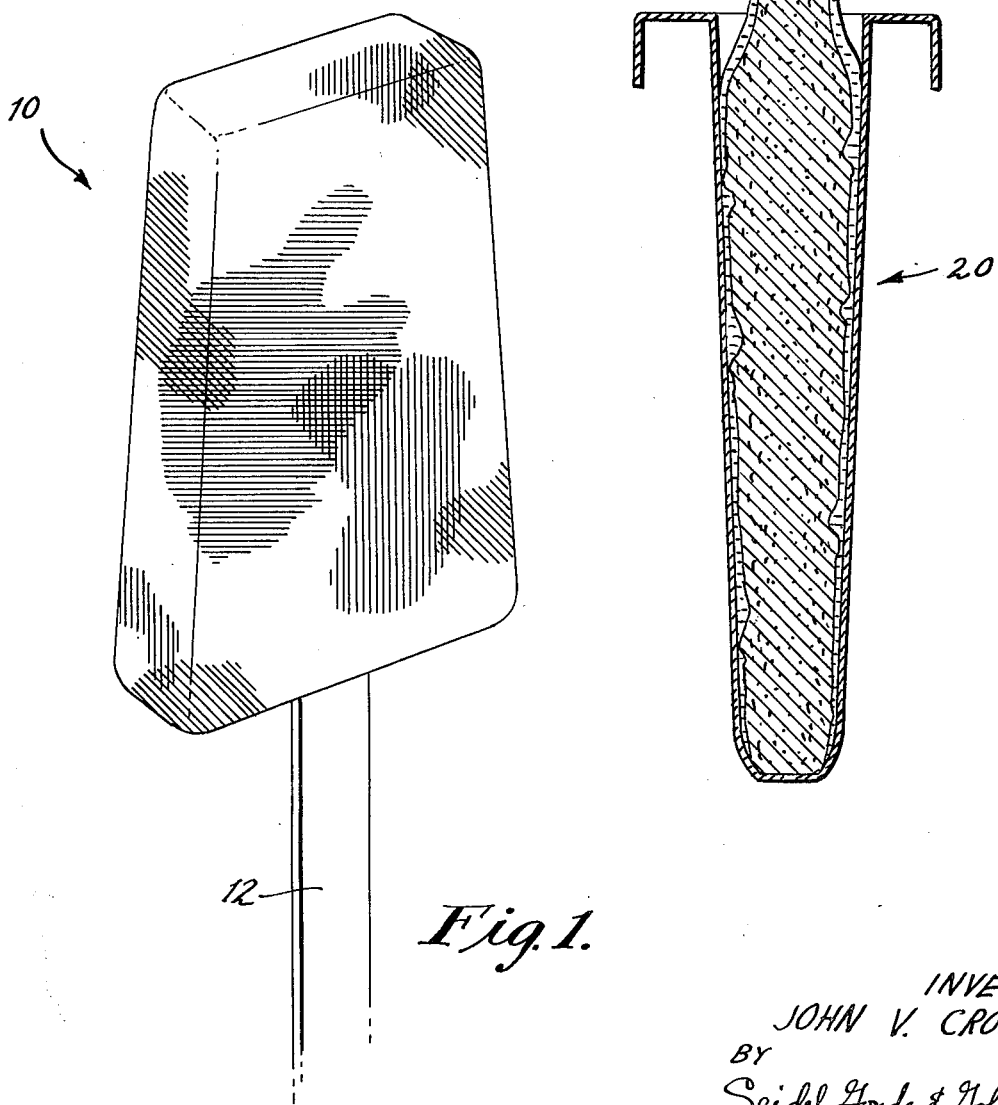

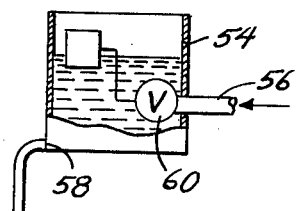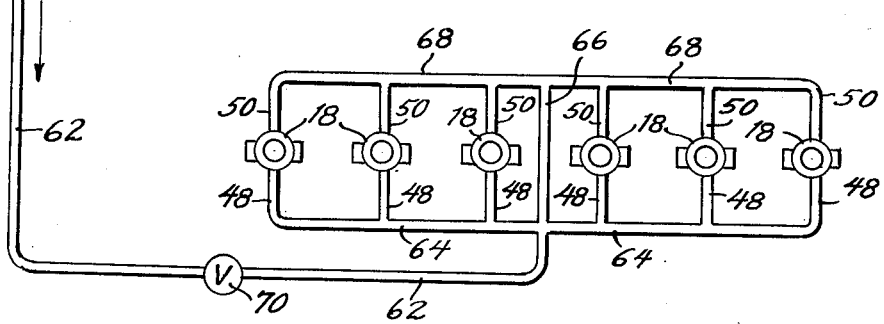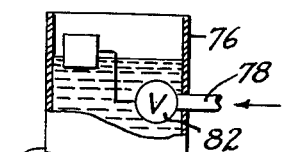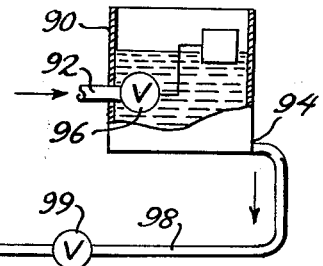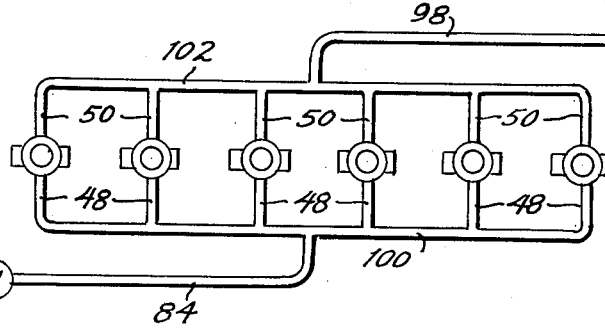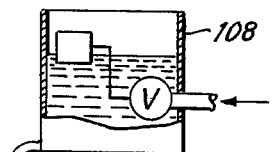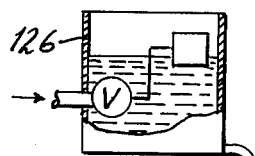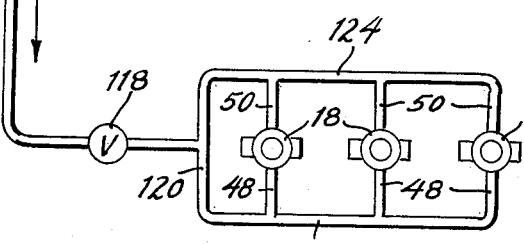

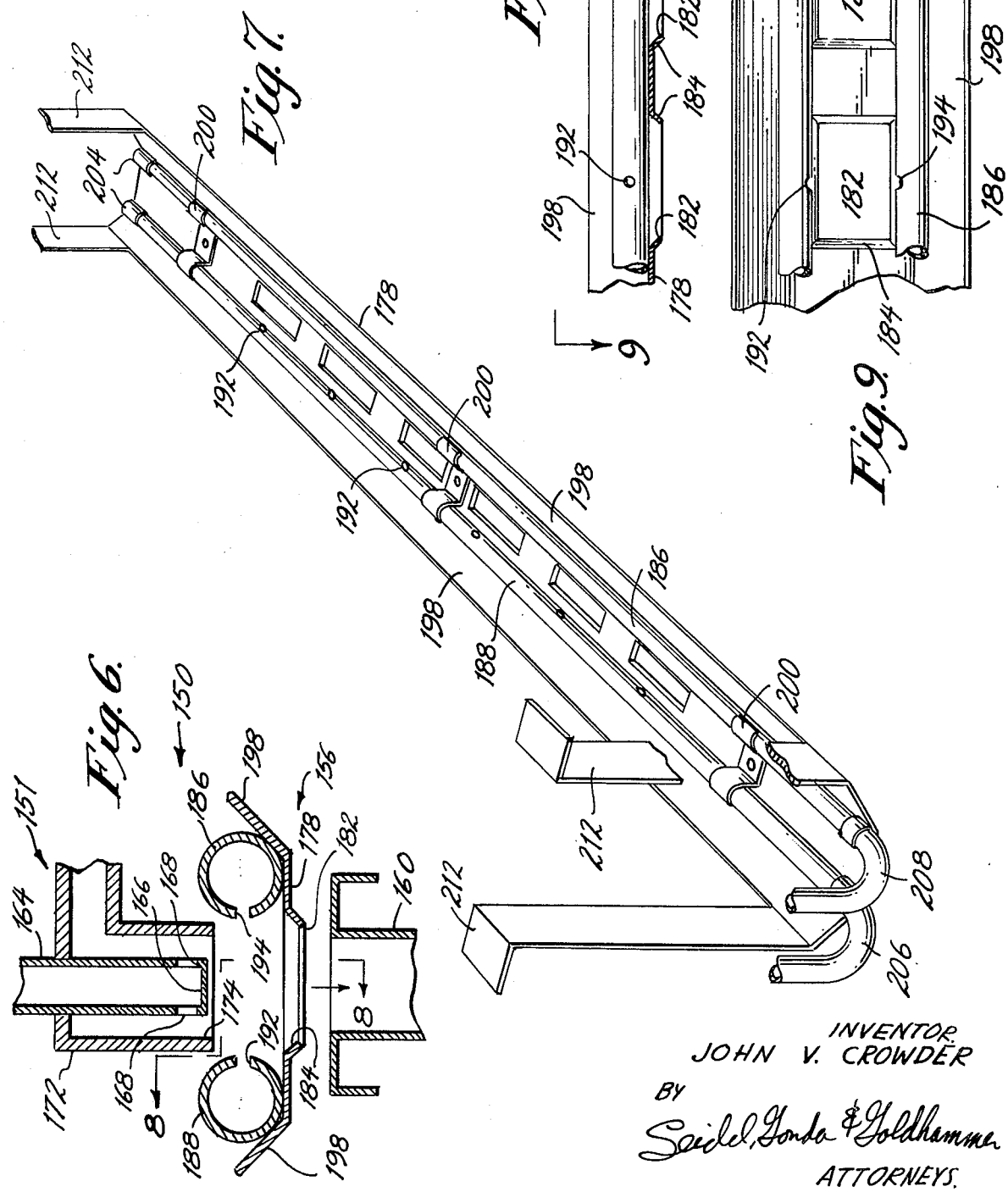

FROZEN CONFECTION AND METHOD AND APPARATUS FOR MAKING SAME

This invention relates to frozen confections and more particularly to a method and apparatus for making the same and a novel confection created thereby.

Frozen confections are well known food items. Often, then are prepared from ice cream or sherbert. Additionally, they are made in varying flavors. Some have even been made with an interior comprised of one ingredient and an exterior coating comprised of a second ingredient.

It is an object of this invention to provide a novel and unobvious apparatus for the manufacture of frozen confections from a plurality of ingredients.

It is another object of this invention to provide an apparatus for the manufacture of frozen confections comprising a plurality of nozzles which can be selectively charged from supply reservoirs in order to create the frozen confection.

It is still another object of this invention to provide a novel and unobvious nozzle for the manufacture of frozen confections.

It is a further object of this invention to provide a novel and unobvious method of making a frozen confection.

It is still a further object of this invention to provide a novel and unobvious frozen confection.

Generally, one aspect of the invention relates to an apparatus for substantially intermixing a plurality of ingredients which will form a frozen confection of the type where each of the ingredients will be substantially discernible. The apparatus comprises a nozzle which is to be positioned over a mold for a frozen confection. The nozzle includes at least first and second conduits for receiving first and second ingredients. The first conduit is disposed within the second conduit. The first conduit has a first discharge opening within the second conduit. The second conduit comprises an outer wall defining a second discharge opening. The outer wall is provided with at least two opposed apertures for introducing at least a third ingredient into the nozzle. All of the ingredients are substantially intermixed before they are discharged through the second discharge opening.

Another aspect of the invention relates to a method for making frozen confections from a plurality of ingredients which comprise the steps of providing first and second normally liquid ingredients having first and second colors. The first and second ingredients are reduced to a substantially frozen form. They they are conveyed to a nozzle and a third ingredient is introduced in its substantially liquid state to a portion of the interface between the second ingredient and the nozzle. Finally all of the ingredients are discharged from the nozzle into a mold.

A further aspect of the invention relates to a frozen confection comprised of a plurality of ingredients of different colors wherein each of the ingredients appears in the confection in a manner so that its color is readily identifiable and also appears in other portions of the confection where the ingredients are mixed together so that colors different from the colors of the original ingredients are formed. The random coloring of the confection appears on its surface and its interior.

A still further aspect of the invention relates to an apparatus for forming frozen confections from a plurality of ingredients comprising a nozzle that includes a substantially planar member having an aperture therein and a plurality of conduits for receiving a plurality of ingredients. The conduits are disposed in overlying relation to the aperture with the first conduit being substantially coaxial with and disposed within the second conduit. The conduits have discharge openings so that the ingredients therein are discharged through the aperture in the substantially planar member to fall into a mold for a frozen confection. Third conduit means for receiving at least a third ingredient is supported by the substantially planar member adjacent the aperture therein. That conduit means is in communication with the aperture to permit at least a third ingredient to be discharged from the third conduit means through the aperture and into the mold.

Finally, the invention relates to a method for making a frozen confection from a plurality of ingredients which comprises the steps of placing some of the ingredients into a mold for a frozen confection. Then, discharging additional ingredients onto the mixture of the first and second ingredients, and then, while the additional ingredients permiate the ingredients already in the mold they are all frozen.

Other objects and advantages of the subject invention will be apparent from a detailed description of presently preferred forms thereof which will now be described in connection with the drawings appended hereto wherein:

FIG. 1 is a perspective view of a frozen confection made in accordance with a preferred form of the invention.

FIG. 2 is a sectional view taken through a nozzle constructed in accordance with one form of the invention.

FIG. 2A is a sectional view taken through a nozzle constructed in accordance with a second form of the invention.

FIGS. 3–5 are schematic plan views of three alternative embodiments of the apparatus used in making the frozen confection illustrated in FIG. 1.

FIG. 6 is a sectional view taken through a nozzle constructed in accordance with a third form of the invention.

FIG. 7 is a perspective view of a portion of the nozzle illustrated in FIG. 6.

FIG. 8 is a sectional view taken along line 8—8 of FIG. 6.

FIG. 9 is a sectional view taken along line 9—9 in FIG. 8.

Referring now to the drawings for a detailed description of the invention, there is seen in FIG. 1 a frozen confection 10 of the type contemplated by this invention. The frozen confection is shown with a stick 12 inserted therein. The stick functions as a handle in a well known manner. As can be seen in FIG. 1 the frozen confection 10 is comprised of a number of zones of varying and intermingled colors.

Referring now to FIG. 2 a nozzle 18 is illustrated in vertical alignment with a suitable mold 20 for use in the manufacture of frozen confections of the type illustrated in FIG. 1. The nozzle comprises a first elongated conduit 24 disposed in substantial alignment with the mold. The first conduit has a suitable inlet opening and is provided with a first vertically positioned discharge opening 26. A second conduit 32 is provided. This conduit which is in axial alignment with the first conduit and which completely surrounds it has a suitable inlet opening for the receipt of a second ingredient which is to be utilized in the manufacture of the frozen confection. The second conduit is comprised of an outer wall 34 which defines at its lower end a second discharge opening 36.

Outer wall 34 is provided with at least two diametrically opposed apertures 44 and 46. These apertures are located in a convenient position on outer wall 34. As illustrated they are shown above the first discharge opening of the first conduit, however, they may be located adjacent or below the first discharge opening. Each of the opposed apertures 44 and 46 is connected to suitable opposed conduits 48 and 50 so that additional ingredients can be transferred to the nozzle by virtue thereof.

In FIG. 2A an alternative arrangement for nozzle 18 is shown. In this arrangement, first elongated conduit 24' is provided with a bottom wall 27. At least two opposed apertures 28 are provided in conduit 24' to permit ingredient to be discharged therefrom. Each of the apertures 28 is positioned a short distance above bottom wall 27. Thus the first ingredient is discharged laterally into the second ingredient rather than axially of it.

This arrangement is advantageous since it contributes to greater intermingling between the first and second ingredients that is achieved by the axial flow of the first ingredient.

Additionally, the use of laterally positioned apertures permits the use of ingredients that are in a stiffer state, i.e., more nearly frozen. If relatively stiff ingredients are used in this configuration, the natural tendency of the ingredients to remain separate is overcome by the lateral force exerted by the ingredient emanating from conduit 24'. Thus the ingredients are mixed to a greater extent prior to their discharge from the nozzle than in the nozzle of FIG. 2.

Further the use of stiffer ingredients is advantageous in reducing the waste due to dripping between the filling of successive banks of molds since the stiffer material will be less likely to drip.

The nozzle is operative to discharge at least three different ingredients into the mold 20. The first ingredient is conveyed by means of the first conduit, the second ingredient is conveyed by means of the second conduit, the third ingredient may be conveyed by the third and fourth conduits 48 and 50 or if preferred the third conduit may convey a third ingredient and the fourth conduit may convey a fourth ingredient. Thus, either three or four ingredients may be conveyed to the nozzle for subsequent transfer to the frozen confection mold 20.

The method for manufacturing the frozen confection illustrated in FIG. 1 comprises introducing a first ingredient 51 into first conduit 24 and introducing a second ingredient 52 into second conduit 32. Preferably both the first and second ingredients should be normally liquids which have been cooled to their substantially frozen form whereby they are somewhat viscous but are still able to flow. The two ingredients should be of distinct colors. For example the first ingredient may be of a yellow color which may be representative of the flavors of either pineapple, lemon or the like while the second ingredient may be comprised of a different color such as a red which is associated with either cherry, rasberry or the like.

A third ingredient 53, which is in a substantially liquid state and which may be comprised of an ingredient having a third color, is introduced through third and fourth opposed conduits 48 and 50. A suitable color for use in the third ingredient may be a blue which is representative of the color of blueberries. This color and the colors of all of the ingredients may be achieved with an artificially colored sugar base composition.

In the nozzle shown in FIG. 2 initial contact may first be made between the third ingredient 53 and the second ingredient 52. Because of the second ingredient 52 is somewhat solid with respect to the third ingredient 53, that ingredient tends to remain along the interface between the second ingredient and the side wall 34 of the nozzle. After the first ingredient is discharged through the first discharge opening 26 the composition, as it enters the end 38 of the nozzle, has an outer shell comprised of the third ingredient and an inner core comprised of the first ingredient and an intermediate donut-like section comprised of the second ingredient.

However, as the three ingredients are forced through the end of the nozzle they intermingle with each other to some extent to form a varying and random pattern. This intermingling of materials is characterized by a merging together somewhat of the first and second ingredients on the interior of the material being discharged from the nozzle with the third ingredient being also intermingled therewith to a somewhat more limited extent. The third ingredient intermixes with the second ingredient to a greater extent than with the first ingredient. This intermixing is further enhanced and compounded by virtue of the fact that the discharge from the nozzle is rather slow in that the mold is somewhat spaced from the nozzle and that the material from the nozzle drops somewhat slowly. Additionally, since the nozzle discharge opening is smaller than the cross section of the mold there is a layering of ingredients in the mold. Thus, as the discharge from the nozzle falls into the mold it tends to move laterally thereof so that the mold fills uniformly.

In the nozzle shown in FIG. 2A, the ingredients are mingled to a greater extent because the ingredient from the first conduit 24' is directed laterally into the second ingredient where they become intermixed prior to discharge from the nozzle. Also, it should be observed that the use of stiffer ingredient made possible by the nozzle shown in FIG. 2A results in a superior product since the heavier ingredients do not shift to the bottom of the mold and collect in a large mass. The likelihood of this occurring if less stiff ingredients are used is much greater.

Further, the prevention of the collection of ingredient in a mass at the bottom of the mold is augmented by using cold molds. The molds are brought to the proper temperature of about −15°F to −40°F by having them in brine of that temperature as they pass the nozzles. The cold molds will assure that the ingredients discharged from the nozzle will be frozen before they have a chance to shift position within the mold.

At a later station a suitable stick 12 is inserted in the mold and the frozen confection is finally treated for packaging.

Referring now to FIGS. 3, 4 and 5 a plurality of nozzles 18 are shown to be connected to each other and to suitable supply reservoirs for the introduction of ingredients into the third and fourth opposed conduits 48 and 50. The significance of the arrangements illustrated in FIGS. 3, 4 and 5 is that a gang of nozzles of the type usually associated with the mass production of frozen confections can be arranged in a plurality of ways so that a variety of interesting and different confections can be manufactured by the same apparatus.

In each of the arrangements illustrated in FIGS. 3, 4 and 5 the technique and apparatus for supplying ingredients to the first and second conduits 24 and 32 are old and well known. Thus, the technique for supplying those conduits with the first and second ingredients will not be discussed, reference being made to the prior art wherein many forms and variations thereof are illustrated. However, what is shown in these Figures is a novel and unobvious manner for supplying the third ingredient to the nozzles and in some instances supplying a fourth ingredient. Advantage of the fact that the latter ingredients are in a semi liquid state is advantageously utilized to simplify the manufacture of the apparatus and to achieve a simple and efficient arrangement which may be readily altered so as to achieve the advantages of each of the arrangements illustrated in FIGS. 3, 4 and 5.

Referring first to FIG. 3 a series of six nozzles 18 are arranged in side by side relation so that a plurality of molds 20 being six abreast can be passed under them in regular ordered succession.

Each of the nozzles is shown to have third and fourth opposed conduits 48 and 50 connected to it so that materials in those conduits will be fed into the opposed inlet aperatures 44 and 46 in each of the nozzles.

A first supply reservoir 54 is provided in this embodiment of the invention since only a third ingredient is to be added. This ingredient is to be added to all six nozzles in equal quantity. The first supply reservoir has a suitable inlet 56 and an outlet 58. The amount of third ingredient in this first supply reservoir is controlled by float valve 60. Preferably the first supply reservoir is about three to four feet above the level of the nozzles. Thus, there is a gravity feed from the supply reservoir to the nozzles which applies a constant force to the nozzles thus controlling the pressure and the rate of flow of the ingredient from the reservoir. This constant force is initially set by adjusting the height of the reservoir above the nozzles. Then, the float valve will automatically permit ingredient to enter the reservoir when the level thereof falls below a certain predetermined height. Thus, a constant pressure head is readily achieved.

By virtue of the natural forces on it, the ingredient flows through outlet 58 and through conduit 62. That conduit is connected at its end to feeder conduit 64 and cross over 66. Cross over 66 is in turn connected to feeder conduit 68. Each of the feeder conduits is connected in turn to the aforementioned third and fourth opposed conduits 48 and 50. Thus, material flowing through conduit 62 flows by way of feeder conduit 64 into opposed conduit 48 on each nozzle. The remainder of the ingredient flowing through conduit 62 travels by way of cross over 66 into conduit 68 whereby it is introduced into the other opposed conduit 50 in each of the nozzles. Thus, what has been described is an apparatus for taking a third ingredient and causing it to run from its supply reservoir by way of the gravity forces on it into each of the nozzles overlying the frozen confection mold.

Additionally, if desired, a suitable cutoff valve 70 may be provided. The function of this cutoff valve is to assure that no material is conveyed by way of conduit 62 until desired. This valve may be controlled by either air or any other suitable means.

In FIG. 4, another arrangement for the nozzles and reservoirs is illustrated. In this arrangement, two supply reservoirs are provided so that each of the opposed conduits 48 and 50 supplying each of the nozzles 18 may be charged with a different ingredient. The net result will be a frozen confection which is comprised of four ingredients rather than one which is comprised of three ingredients.

In this arrangement a first supply reservoir 76 has an inlet 78 and an outlet 80. The amount of material entering the reservoir is controlled by a float valve 82. A conduit 84 has one end connected to an outlet 80. A valve 86 similar in construction to aforementioned valve 70 is operative to selectively permit material to flow through conduit 84. A second supply reservoir 90 having another ingredient also comprises an inlet 92 and an outlet 94. Again, the amount of material entering the reservoir through inlet 92 is controlled by a float valve 96. A conduit 98, which is connected to outlet 94, is controlled by a valve 99.

Conduit 84 is connected to a first feeder conduit 100 which is connected to all of the third opposed conduits 48 in the bank of nozzles. Conduit 98 is connected to a second feeder nozzle 102 which in turn is connected to all of the fourth opposed conduits 50 which are connected to each nozzle. Thus, the ingredient flowing from first supply reservoir 76 flows by way of conduit 84 and first feeder conduit 100 into all of the nozzles. Similarly, the ingredient in the second supply reservoir 90 flows by way of conduit 98 and second feeder conduit into the opposite side of each nozzle. The result is an interesting and unobvious frozen confection which is comprised of a plurality of ingredients and a plurality of colors. As explained above, each of the colors of the various ingredients is, to some extent, randomly disposed in discrete portions wherein they are readily identifiable. On the other hand, other randomly disposed portions of the ingredients are arranged so that they are intermingled with each other to provide colors which are different from the first colors. For example, the blue ingredient may be mixed with the red ingredient to form a purple or violet color. The yellow ingredient may be intermingled with the red ingredient and the blue ingredient to form either orange or green.

Again, as explained in connection with FIG. 3, the reservoirs 76 and 90 are both arranged approximately 3 to 4 feet above the level of the nozzles so that they are fed the ingredients under a constant pressure which is determined by the forces of gravity.

In FIG. 5, the same bank of nozzles as discussed in FIGS. 3 and 4 are arranged so as to make two different types of frozen confections simultaneously. To this extent, the bank of six nozzles has been divided in half with three of the nozzles receiving ingredients from one supply reservoir and the other three nozzles being supplied ingredients from another reservoir. It is obvious that division in half has been illustrated by way of convenience since most of the nozzles may be supplied with one ingredient or as many nozzles as desired may be supplied with a given ingredient. Referring now to FIG. 5 in detail, a first supply reservoir 108 which is positioned approximately 3 to 4 feet above the level of nozzles 18 is provided with a suitable inlet controlled by a float valve described above and a suitable outlet which is connected by a conduit 116 across a valve 118 to a first cross over 120. The cross over 120 feeds the ingredient from the first reservoir to a first feeder conduit 122 and a second feeder conduit 124. In a manner similar to that described above, the first feeder conduit 122 supplies ingredients from the first reservoir to the third opposed conduit 48 on each of the nozzles to which it is connected while the second feeder conduit 124 supplies that same ingredient to the fourth opposed conduit 50 on each of the nozzles. Thus, the ingredients from the first reservoir 108 are supplied to both sides of the nozzles.

In like manner, a second supply reservoir 126 which is substantially the same as supply reservoir 108 is also provided. This reservoir is also approximately 3 to 4 feet above the height of the nozzles and is provided with suitable inlet and outlet conduits, the inlet conduit being controlled by a float valve.

The outlet of this second supply reservoir is connected to an outlet conduit 130 which by way of a suitable air valve 132 is connected to a cross over 134. The cross over supplies material from the second reservoir to first and second feeder conduits 136 and 138. These feeder conduits in turn are connected to the opposed third and fourth conduits 48 and 50 on each of the nozzles.

Thus, in this latter embodiment of the invention the bank of nozzles can be divided in any arbitrary fashion and filled from the two supply reservoirs.

It should be noted that while the invention has been described with reference to merely two opposed apertures 44 and 46 and two opposed conduits 48 and 50, it is apparent that any convenient number of opposed apertures may be provided, such as four, six, eight or the like. Additionally, it is clear that the apertures need not be opposed and thus anay suitable number may be utilized, it being recognized that the resultant effect will be dependent upon the number of such apertures and conduits and the manner in which they are located on the nozzle.

Furthermore, it should be noted that all of the conduits described in connection with FIGS. 3, 4 and 5 are comprised of a suitable flexible material so that they can be readily interchanged. Preferably, the material should comprise lengths of Tygon, nylon or tubing or other suitable material that is satisfactory for use in the manufacture of food products. Additionally, all "Tee" connections and junctures between adjacent elements can be made from suitable stainless steel or nylon conduits. Thus, the rapid interchangeability of the apparatus between the various arrangements illustrated in FIGS. 3, 4 and 5 can be achieved.

Referring to FIGS. 6–9, another form of nozzle 150 for filling a frozen confection mold with a plurality of ingredients is illustrated.

In FIG. 6 the nozzle 150 is actually comprised of an upper component 151 for supplying two of the ingredients of the frozen confection and a lower component 156 for supplying at least a third ingredient of the frozen confection. Disposed immediately below the lower component of the nozzle is a mold for a frozen confection 160.

It should be understood that in actuality a plurality of nozzles 150 are disposed in an array similar to that shown in FIGS. 3–5 wherein a plurality of molds 160 may be progressively moved beneath them so that the molds may be filled with ingredients. Thus, while the ensuing description will relate specifically to the details illustrated in FIG. 6, that description will suffice as a description of all nozzles 150 which can be used in a typical array.

The upper component of the nozzle 151 is constructed in a manner similar to the nozzle illustrated in FIG. 2A. To this extent it includes a first conduit 164 adapted to receive a first ingredient in its substantially frozen form. The first conduit has a bottom wall 166 precluding axial discharge of the first ingredient. However, it is provided with a plurality of radially directed openings 168 which permit lateral discharge of the frozen ingredient into a second conduit 172. Thus, first conduit 164 and second conduit 172 are coaxial. A second ingredient, also in substantially frozen form, is discharged through the bottom discharge opening 174 in the second conduit. Preferably the first and second ingredients are of different colors.

Thus, as is apparent, the material discharged through opening 174 in second conduit 172 will comprise a mixture of the first and second ingredients since the first ingredient has already introduced into the second conduit by way of radially directed openings 168.

The lower component 156 of the nozzle comprises a substantially elongated flat plate 178 with a plurality of regularly spaced apertures 182 therein. While it is preferred that the apertures be generally of rectangular configuration such configuration is not essential to the manner of operation of the invention. Accordingly, the configuration of the aperture may be changed as is convenient.

Preferably, each of the apertures 182 is provided with a drip lip 184 which extends substantially around its entire perimeter. The drip lips slope downwardly and inwardly towards the center of the aperture for a purpose which will be described.

Two opposed elongated conduits 186 and 188 are supported by elongated flat plate 178 immediately adjacent the sides of the apertures 182. As illustrated in FIG. 7, conduits 186 and 188 run substantially the entire length of the elongated flat plate 178. Each of the conduits is provided with a plurality of regularly spaced inwardly faced openings 192, 194 which serve as discharge outlets for ingredients in those conduits. As illustrated in FIGS. 6 and 9, the conduits 192 and 194 substantially overlie their respective drip lips on either side of apertures 182. Thus, ingredients being discharged from conduits 186 and 188 may be guided by the drip lips into mold 160.

As shown best in FIG. 6, the lower component of the mold is provided with upwardly and outwardly sloping side walls 198. These side walls function primarily to confine all of the ingredients within the nozzle area, thus, obviating the possibility of ingredient spilling over the sides. Additionally, the upwardly slopping side walls provide a recess area into which the elongated conduits 186 and 188 may be nestled. The conduits may be firmly secured to the elongated flat plate 178 by a plurality of regularly spaced clamps 200.

As explained above with reference to the embodiments of the invention illustrated in FIGS. 3–5 first and second conduits 164 and 172 may be utilized to discharge first and second ingredients in substantially frozen form into mold 160. However, conduits 186 and 188 are used primarily to discharge a substantially liquid ingredient having a third color into the molds. This liquid ingredient is discharged by a suitable gravity feed in a manner akin to that illustrated in FIGS. 3 and 4 wherein the same ingredient is permitted to enter conduits 186 and 188 from a suitable reservoir or in the alternative different ingredients from different reservoirs are permitted to enter these conduits. Thus, three or four ingredient frozen confections may be made.

In order to implement this feature of the invention, each of the conduits is closed at one end by a suitable plug member 204. At its other end, each of the condutis is provided with a suitable leader conduit 206 or 208 by which it may be connected to a suitable reservoir. As is readily understood both conduits 206 and 208 may be connected to the same reservoir or to different reservoirs depending on whether it is desired to add one or two additional ingredients to the ingredients being discharged from the upper component of the nozzle.

As indicated above, the nozzles are provided in a bank which is disposed across the path of travel of a plurality of molds. Thus, as illustrated in FIG. 7 provisions for at least six nozzles are provided. Suitable mounting means for holding the elongated plate above the path of travel of the molds is provided in the form of brackets 212 which permit the plate to be suspended from a suitable support.

A manner of using the embodiment of the invention illustrated in FIGS. 6–9 it is comprised of merely discharging ingredients from all conduits simultaneously into the mold. Since the conduits are substantially smaller than the mold cross section there will be lateral shifting of ingredients therein which results in a pleasing distribution of all of the ingredients wherein they are intermingled so that to some extent their colors are combined in some areas to make a plurality of colors which are different from the colors of the original ingredients and in other areas they appear as discrete quantities wherein their original colors are preserved.

The molds are then quickly introduced into a brine solution having a temperature of −15° F to −40° F wherein the ingredients are quickly frozen.

Ostensibly, a different manner of preparation of the frozen confection could be achieved by separating the functions of and upper and lower nozzle components to the extent that initially, the first and second ingredients are discharged into the mold. At a second station the third or fourth ingredients are discharged into the mold, coming to rest on top of the first and second ingredients. Since the third or fourth ingredients will be substantially liquid they will tend to permiate the first and second ingredient causing the multitude of color variations discussed throughout this specification. At a predetermined time after the introduction of the third and fourth ingredients, the mold may be introduced into a brine solution having a temperature of about −15° F to −40° F wherein all of the ingredients will be quickly brought to a frozen state. Thus, a frozen confection of the type described above can be readily achieved by this method. As is apparent the embodiment of the invention described in FIGS. 6–9 is particularly suited to this latter method since the upper and lower components of each of the nozzles may be separated from each other as well as being used in the manner illustrated in FIG. 6. Additionally, other nozzles may be used in order to introduce the ingredients at two separate stations.

While the invention has been described with particular reference to a number of embodiments thereof, it is apparent that many other forms and embodiments of the invention will be apparent to those skilled in the art. Thus, the scope of the invention should not be limited to the forms, embodiments, and methods illustrated and described in the foregoing specification, but rather only by the scope of the claims appended hereto.

I claim:

1. A method of making a frozen confection from a plurality of ingredients comprising the steps of providing first and second normally liquid ingredients having first and second colors, reducing said first and second ingredients to a substantially frozen form, conveying said first and second ingredients to a nozzle with said first ingredient being arranged within said second ingredient, directing said first ingredient laterally of its flow path into said second ingredient to substantially intermix them, introducing a third normally liquid ingredient in its substantially liquid state to a portion of the interface between said second ingredient and said nozzle, and discharging all of said ingredients into a mold.

2. A method as defined in claim 1 wherein said mold is in brine having a temperature of −15°F to −40°F.

3. A method as defined in claim 1 including introducing a fourth normally liquid ingredient in its substantially liquid form to another portion of the interface between said second ingredient and said nozzle simultaneously with the introduction of said third ingredient.

* * * * *